May 7, 1946. A. S. ODEVSEFF 2,399,886
CLUTCH
Filed Dec. 27, 1944
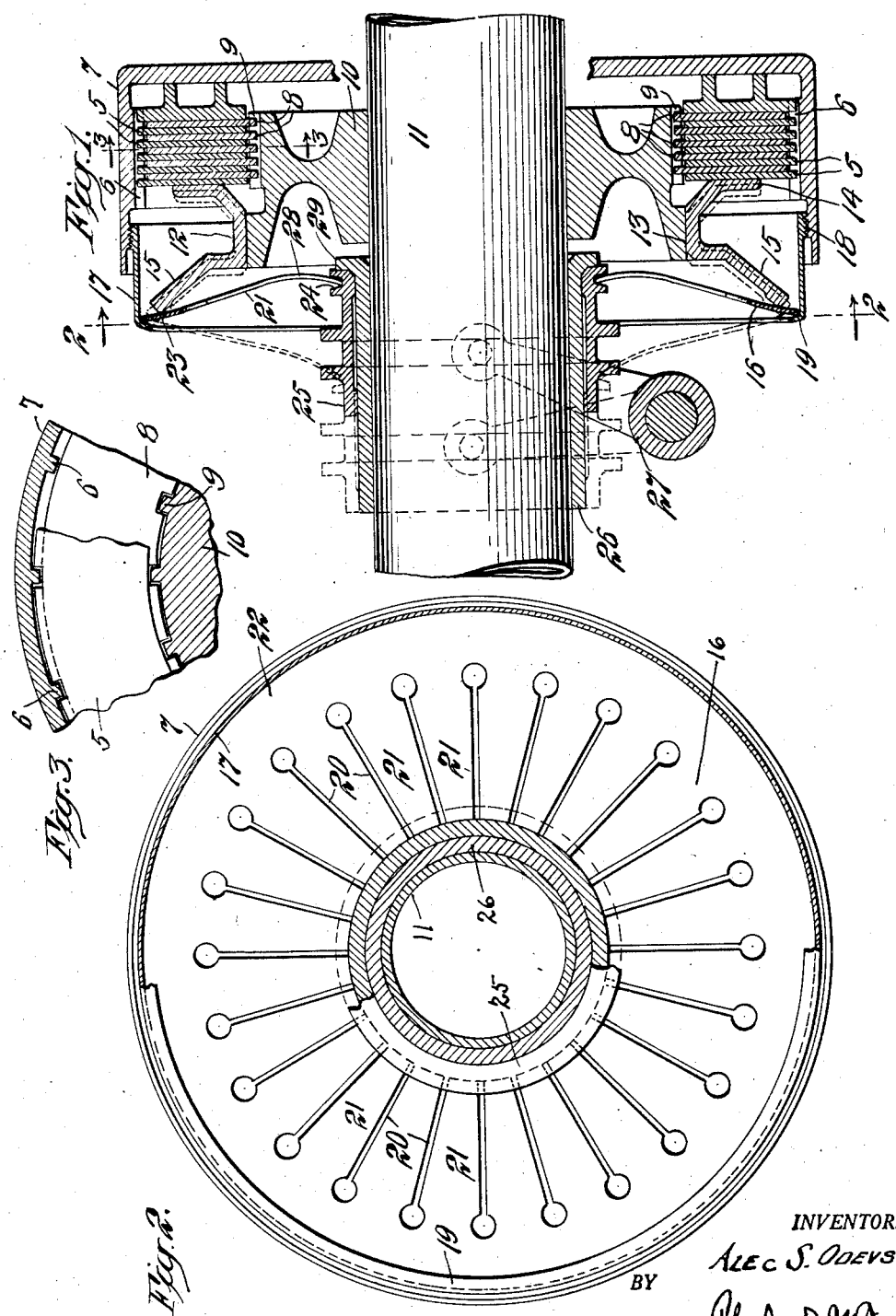
INVENTOR.
Alec S. Odevseff
BY
ATTORNEY Patented May 7, 1946

2,399,886

UNITED STATES PATENT OFFICE 2,399,886

CLUTCH

Alec S. Odevseff, Wichita, Kans., assignor to Beech Aircraft Corporation, Wichita, Kans., a corporation of Delaware Application December 27, 1944, Serial No. 570,492

6 Claims. (Cl. 192—69)

The invention herein disclosed relates to friction clutches.

Special objects of the invention are to provide a clutch in which the parts will be maintained in the engaged or in the disengaged relation without axial load on the collar or other element employed for effecting engagement and disengagement of the clutch parts.

Other special objects are to provide a clutch construction of few, simple parts, in compact relation and taking up small space, considering the load capacity of the clutch.

Other desirable objects and the novel features by which the purposes of the invention are attained will appear or are set forth in the course of the following specification.

The drawing accompanying and forming part of the specification illustrates a present practical embodiment of the invention. The structure, however, may be modified and changed as regards the immediate illustration, all within the true intent and broad scope of the invention as hereinafter defined and claimed.

Fig. 1 in the drawing is a broken central cross sectional view of a clutch of the present invention;

Fig. 2 is a broken transverse cross sectional view generally on the plane of line 2—2 of Fig. 1;

Fig. 3 is a broken cross sectional detail on substantially the plane of line 3—3 of Fig. 1.

In the embodiment of the invention illustrated, clutching engagement between two relatively rotatable members is effected between one set of clutch discs 5 keyed at 6 to an outer, shell or enclosing member 7 and a companion set of interposed discs 8, keyed at 9 to an inner clutch member or spider 10.

The clutch members 7 and 10 may be considered as the driving and driven clutch elements and as being mounted on coaxial shafts, the shaft on which the spider is fixed being indicated at 11.

A ring 12 is shown slidingly supported on a cylindrically formed portion 13 of the spider 10, said ring carrying at its inner end an annular flange 14 for engagement with the outermost clutch plate and having at its outer end a radially extended and outwardly inclined flange 15.

The clutch closing pressure is applied to the flange 15 by a spring disc 16 supported at its outer edge within the cylindrical member 17 adjustably screwed at 18 into the outer end of the shell or casing portion 7 of the clutch.

The cylindrical cover member 17 is shown as having an inturned flange 19 at the outer rim of the same, confining and locating the edge of the spring disc and serving as a peripheral fulcrum for such disc.

To provide a desired degree of resiliency, the disc is shown as slotted radially inwardly at 20 to form spring segments or levers 21 projecting radially inwardly from the continuous or unslotted outer, annular rim portion 22. The latter, at its inner side, engages the outer edge of the inclined flange 15, at 23, to serve as a continuous annular lever.

The inner ends of the spring segments 21 are shown as engaging in a groove 24 in a clutch shifting collar 25 slidably mounted on the sleeve 26 carried by shaft 11. A yoke for shifting this clutch engaging and disengaging collar is indicated at 27.

As shown in Fig. 1, the spring fingers 21 are longer than the radial distance from the fulcrum point 19 for the rim of the disc to the bottom of the groove 24 in the clutch collar. Consequently these fingers are forced to buckle, as indicated at 28. Also, the clutch collar has an axial movement sufficient to carry the inner ends of these spring fingers past dead center in both directions, thus to rock or cone the outer rim portion of the disc to opposite sides of an initial flat plane of the disc. As a result, a powerful clutch closing leverage can be applied to the flange 15 of the clutch closing ring 12 and with but a short throw or dishing movement of the spring disc.

The full lines in Fig. 1 show how in the clutch closed position the segmented disc, from the fulcrum point at the outer rim to the supported portion at the inner rim, may take the form radially of an ogee curve, with a small concave bend at the line of engagement 23 with the pressure ring and a larger convex curve at 28 in the power applying spring segments. These segments, under the compression load, act as spring levers to hold the clutch yieldingly engaged, and this without any external axial load on the clutch collar. The latter, in the clutch closed position, may engage with a stop shoulder 29 on the inner end of the supporting sleeve 26. The outer clutch release position of the collar may be similarly governed, though, as indicated in the broken lines, Fig. 1, the spring fingers, by their engagement in the groove 24, may be utilized to yieldingly retain the clutch collar in the outer clutch released position.

In the operation of the clutch the spring fingers or levers 21 may pass through the dead center position with more or less of a snap action, thus to quickly close or open the clutch. By adjusting the fulcrum carrying cover 17 into or out of the clutch shell 7, the final position and hence the pressure applied to the clutch discs may be regulated to suit the clutch action to different specific operations. As the spring force is provided by the radial buckling of the disc, this may be simply a disc of thin spring sheet material, all of the same original even thickness formed to insure that in passing dead center, it will always buckle inwardly to the same side as indicated on the drawing. The springy character of the disc makes it more or less self-compensating to take up wear, but if adjustment is needed this can be effected by adjusting the fulcrum cover one way or the other. The spring disc engaging the floating pressure ring at a point near the fulcrumed edge and having the power applied at or through the inner edge, constitutes an effective lever of the second class.

While disclosed as a friction, multiple plate form of clutch, it will be apparent that the invention may be incorporated in single plate and in other forms of clutches, such as those of the positive jaw type.

What is claimed is:

1. A clutch comprising companion clutch elements, an annular clutch closing ring, an annular spring disc fulcrumed at its outer edge and engaging said clutch closing ring inwardly of said fulcrumed outer edge and a clutch collar engaged with the inner edge of said annular spring disc and having a movement to deflect said spring disc past dead center in opposite directions, the radial extent of said spring disc between said fulcrumed outer edge and such clutch collar engaged inner edge being greater than the true radial distance between said parts whereby said clutch collar will buckle said spring disc in such movement past dead center and means for effecting axial adjustment of one of said edges of the annular spring disc.

2. A clutch comprising companion clutch elements, an annular clutch closing ring, an annular spring disc fulcrumed at its outer edge and engaging said clutch closing ring inwardly of said fulcrumed outer edge and a clutch collar engaged with the inner edge of said annular spring disc and having a movement to deflect said spring disc past dead center in opposite directions, the radial extent of said spring disc between said fulcrumed outer edge and said clutch collar engaged inner edge being greater than the true radial distance between said parts and whereby said clutch collar will impose radial curvature on said spring disc in such movement past dead center.

3. A clutch comprising companion clutch elements, an annular clutch closing ring, an annular spring disc fulcrumed at its outer edge and engaging said clutch closing ring inwardly of said fulcrumed outer edge and a clutch collar engaged with the inner edge of said annular spring disc and having a movement to deflect said spring disc past dead center in opposite directions, the radial extent of said spring disc between said fulcrumed outer edge and said clutch collar engaged inner edge being greater than the true radial distance between said parts and whereby said clutch collar will impose radial curvature on said spring disc in such movement past dead center, and stop means limiting movement of said collar in the clutch closing direction to a point where said spring disc will be held stressed in a bowed condition.

4. A clutch comprising companion clutch elements, an annular clutch closing ring, an annular spring disc fulcrumed at its outer edge and engaging said clutch closing ring inwardly of said fulcrumed outer edge and a clutch collar engaged with the inner edge of said annular spring disc and having a movement to deflect said spring disc past dead center in opposite directions, the radial extent of said spring disc between said fulcrumed outer edge and said clutch collar engaged inner edge being greater than the true radial distance between said parts and whereby said clutch collar will impose radial curvature on said spring disc in such movement past dead center, and means for effecting axial adjustment of said fulcrumed outer edge of said annular spring disc.

5. A clutch comprising a clutch barrel, a spider within the same, clutch plates interposed between and keyed to said barrel and spider, respectively, a clutch closing ring slidably supported on said spider and bearing at its inner end against said clutch plates, an annular spring disc fulcrumed at its outer edge on said clutch barrel and engaging the outer end of said clutch closing ring inwardly of the fulcrumed edge of the disc, and a clutch collar engaged with the inner edge of said annular spring disc and having a movement to deflect the intermediate portion of said disc past dead center.

6. A clutch comprising a clutch barrel, a spider within the same, clutch plates interposed between and keyed to said barrel and spider, respectively, a clutch closing ring slidably supported on said spider and bearing at its inner end against said clutch plates, an annular spring disc fulcrumed at its outer edge on said clutch barrel and engaging the outer end of said clutch closing ring inwardly of the fulcrumed edge of the disc, and a clutch collar engaged with the inner edge of said annular spring disc and having a movement to deflect the intermediate portion of said disc past dead center, the radial extent of said annular disc being greater than the radial distance between said fulcrumed outer edge and clutch collar for buckling said intermediate portion of the spring disc.

ALEC S. ODEVSEFF.